United States Patent [19] [11] 4,125,823

Hall, Jr. [45] Nov. 14, 1978

[54] SEISMIC TRANSDUCER FOR MARSHY TERRAINS

[75] Inventor: Ernest M. Hall, Jr., Houston, Tex.

[73] Assignee: Western Geophysical Co. of America, Houston, Tex.

[21] Appl. No.: 816,786

[22] Filed: Jul. 18, 1977

Related U.S. Application Data

[63] Continuation-in-part of Ser. No. 704,148, Jul. 12, 1976, Pat. No. 4,092,628.

[51] Int. Cl.[2] .................. G01V 1/00; H04B 13/00; H04R 15/00

[52] U.S. Cl. .................. 340/17 R; 340/10

[58] Field of Search .................. 340/7 R, 8 S, 8 LF, 340/8 R, 9, 10, 17 R; 310/337

[56] References Cited

U.S. PATENT DOCUMENTS

| | | | |
|---|---|---|---|
| 2,925,582 | 2/1960 | Mattei et al. | 340/10 X |
| 3,090,939 | 5/1963 | Massa | 310/337 X |
| 3,255,431 | 6/1966 | Howatt | 340/10 |
| 3,586,889 | 6/1971 | Kolter | 340/10 X |
| 3,932,834 | 1/1976 | Sutherland | 340/8 R X |

*Primary Examiner*—Theodore M. Blum
*Attorney, Agent, or Firm*—William A. Knox

[57] ABSTRACT

The seismic transducer comprises a hollow, elongated casing having a bore defining a chamber. An opening extends through the wall of the casing into the chamber. A hydrophone is removably disposed inside the chamber. The hydrophone comprises an elastomer body in a portion of which is embedded a rigid cage marginally supporting a pressure detector assembly. Means are coupled to the casing for exerting a static pressure on the elastomer body. The cage has a geometric configuration adapted to substantially shield the detector from the static pressure which causes the end portions of the elastomer body to expand outwardly, whereby each end portion forms a fluid-tight seal against the wall of the chamber.

3 Claims, 8 Drawing Figures

SEISMIC TRANSDUCER FOR MARSHY TERRAINS

REFERENCE TO RELATED APPLICATION

This application is a continuation-in-part of my co-pending application Ser. No. 704,148, filed July 12, 1976 and now U.S. Pat. No. 4,092,628.

BACKGROUND OF THE INVENTION

In my copending application Ser. No. 704,148, I have described a seismic transducer for marshy terrains which comprises a casing having a bore and a hydrophone slidably mounted in the bore. The casing has in its side wall a plurality of openings. The hydrophone includes an elastomer core in which is completely embedded a pressure detector. The core serves to transmit sound waves impinging through the casing's openings to the detector. A bottom end cap is threadedly coupled to the casing for compressing the elastomer core, whereby portions of the core form plugs which extend through and seal the openings in the side wall of the casing.

It has been found that in order for these plugs to adequately seal the openings in the casing, the end cap must exert a large static pressure on the elastomer core. This pressure establishes a large static load on the detector itself, which has the undesirable effect of appreciably reducing the sensitivity of the detector to seismic waves transmitted through the openings in the casing. If the pressure exerted by the end cap against the elastomer core were to be reduced, so as not to appreciably decrease the sensitivity of the detector, then the plugs formed by the elastomer core would insufficiently seal the openings in the casing.

In U.S. Pat. No. 3,932,834 assigned to the same assignee, there is described a similar transducer for marshy terrains but in which the pressure detector is completely embedded in an elastomer body which completely fills the bore of the casing and which is cemented to the wall of the bore. In use, it was found that the elastomer body would frequently become unglued from the wall of the casing, allowing water to leak through the casing's openings, thereby corroding the electric parts coupled to the detector outside of the elastomer body and in the casing's bore.

The present application describes a seismic transducer embodying the novel structural features generally disclosed in the aforementioned copending application Ser. No. 704,148, the main distinction being that means are now embedded inside the elastomer body for shielding the pressure detector from substantially all the static pressure exerted on the elastomer body, thereby considerably improving the sensitivity of the detector. The applied pressure causes the opposite end portions of the elastomer body to form fluid-tight seals against the wall of the casing's bore. The means inside the elastomer body is a cage which prevents the formation of the aforementioned plugs, so that the seismic waves pass through the openings in the casing and become exerted upon a greater exposed surface of the elastomer body.

SUMMARY OF THE INVENTION

The seismic transducer unit comprises an elongated casing having a bore defining a hydrophone-receiving chamber. One or more openings extend through the wall of the casing into the chamber. A hydrophone is removably disposed inside the chamber. The hydrophone comprises an elastomer body having a rigid cage completely embedded in the center portion thereof. A pressure detector is marginally supported inside the cage for detecting seismic waves impinging on the side wall of the elastomer body through the openings in the casing. Adjustable means are coupled to the casing for exerting a static pressure on the elastomer body. The cage has a geometric configuration so as to substantially shield the center portion of the elastomer body, and hence the pressure detector, from this static pressure and to allow the opposite axial end portions of the elastomer body to expand outwardly, whereby each end portion forms a fluid-tight seal against the wall of the hydrophone-receiving chamber. Electric means are coupled to the hydrophone for receiving and conducting electric signals generated by the pressure detector.

DESCRIPTION OF THE PREFERRED EMBODIMENT

Figure 1:
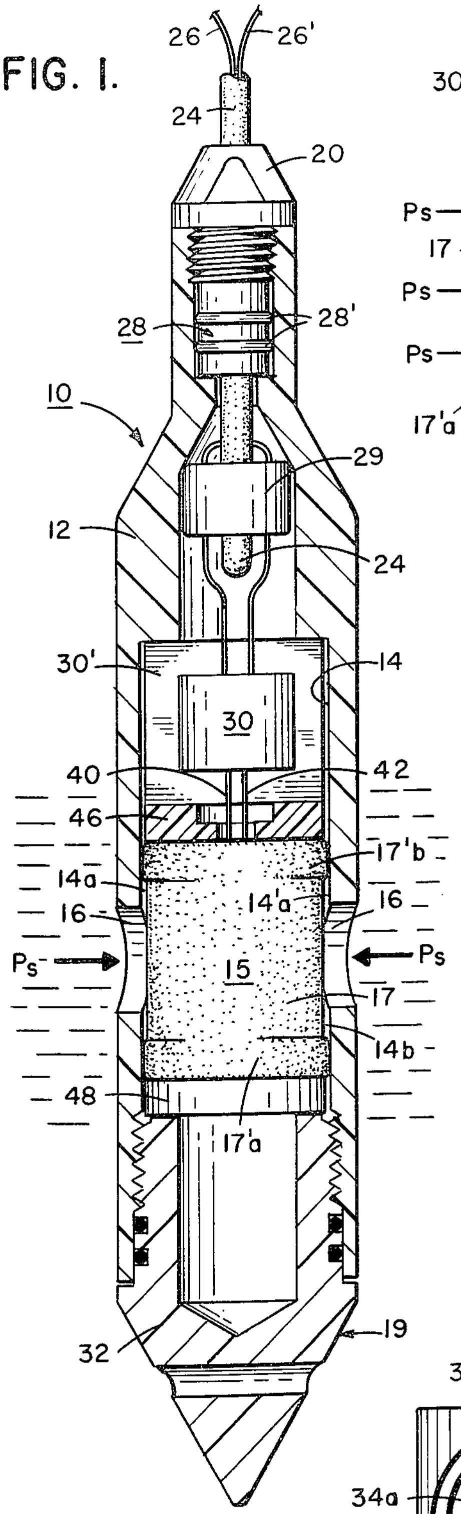
FIG. 1 is a view in elevation, partly in section, of one embodiment of the transducer in accordance with this invention.

In the preferred embodiment, the seismic transducer, generally designated as 10, comprises an elongated, hollow, generally cylindrical casing 12 made of a rigid material which can be metal or plastic. Casing 12 has a longitudinal bore 14 defining a hydrophone-receiving chamber **14*a* which communicates with one or more angularly-spaced openings 16** extending through the side wall of the casing.

Removably mounted inside chamber **14*a* is a hydrophone, generally designated as 15. The hydrophone is comprised of an elastomer body or core 17 in the central portion of which is fully embedded a cage, generally designated as 34. The cage is made of a rigid material such as aluminum. A rigid plastic can also be used for making the cage. In the preferred embodiment, cage 34 has a cylindrical configuration with an outer diameter slightly less than the outer diameter of core 17. A cylindrical bore 34*a*, having an axis 34*b*, extends through cage 34. Axis 34*b* is perpendicular to the longitudinal axis 34*c*** of the cage.

Extending inwardly from the center of bore **34*a* is an annular shoulder 35 for supporting a detector assembly having one but preferably a pair of piezoelectric pressure detectors or crystals 37, 37' mounted on conductive electrodes 36, 36', respectively, made of brass or berylium copper. The electrodes are marginally supported by shoulder 35. Detectors 37, 37' are connected in parallel by a conductor 41 and the electrodes 36, 36' are connected in parallel by a conductor 43. The hydrophone has a pair of output terminals 27, 27' connected to the pair of parallelconnected detectors via conductors 40, 42**, respectively.

The output terminals 27, 27' of the hydrophone are typically connected to the primary winding of a transformer 30 whose secondary winding is connected to a cable 24 having a pair of insulated wires 26, 26'. The cable is anchored to the casing 12 by a suitable anchor 29, preferably of the type described in U.S. Pat. No. 3,931,453, assigned to the same assignee. Anchor 29 prevents tension from becoming transmitted by cable 24 to hydrophone 15 or to transformer 30. A water seal 28 having a pair of O-rings 28' prevents water from entering through the top end cap 20 into bore 14.

Figure 2:
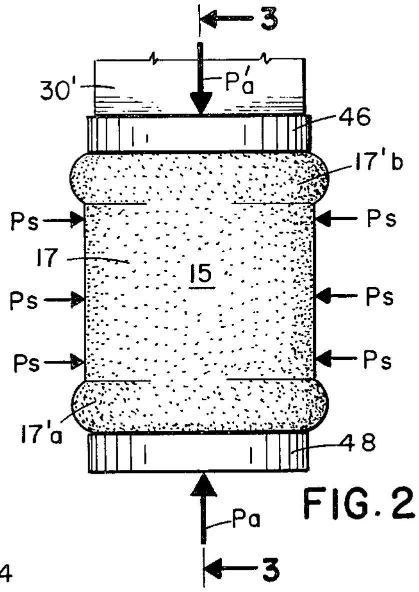
FIG. 2 is a view in elevation of the hydrophone when axially compressed to form annular end seals.
Figure 8:
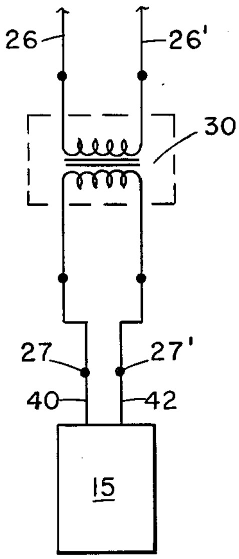
FIG. 8 is an electric circuit diagram of the transducer.
Figure 3:
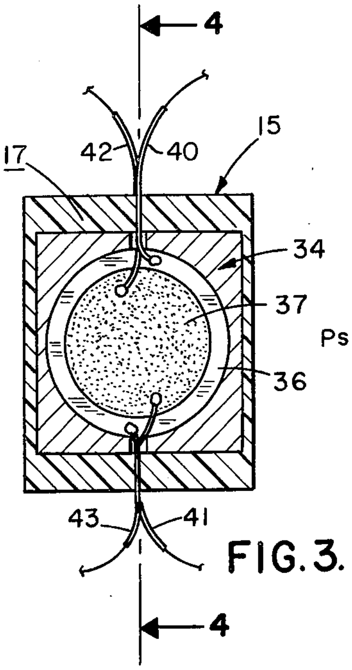
FIG. 3 is a sectional view on line 3—3 in FIG. 2.
Figure 4:
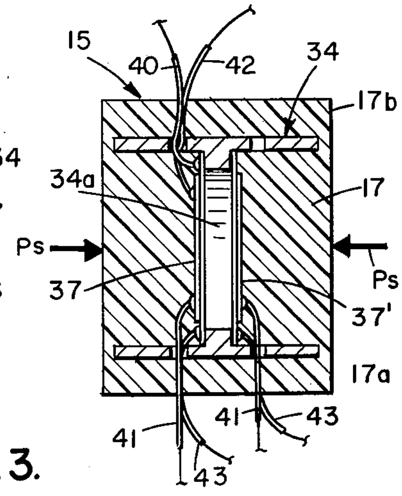
FIG. 4 is a sectional view on line 4—4 in FIG. 3.
Figure 5:
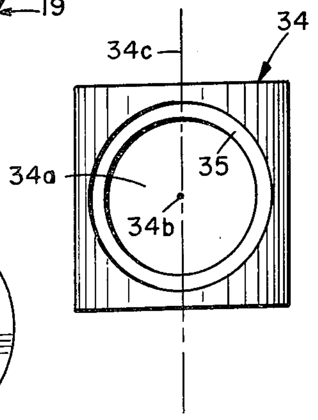
FIG. 5 is a front view in elevation of the rigid cage.
Figure 6:
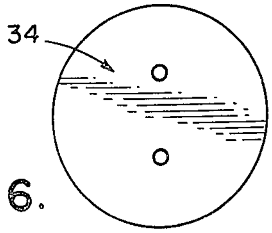
FIG. 6 is a top view of the cage.
Figure 7:
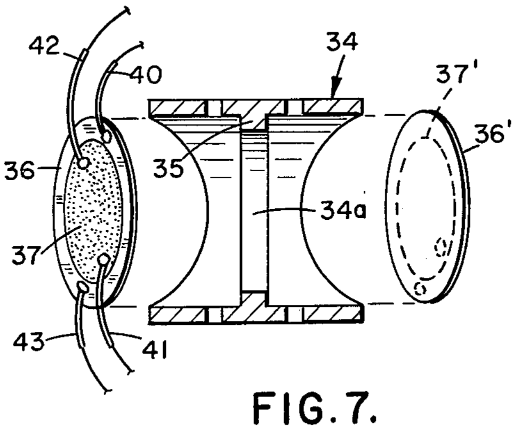
FIG. 7 is an exploded view, partly in section, of the cage and of the detector assembly mounted therein.

The outer diameter of hydrophone 15 is slightly smaller than the inner diameter of bore 14 to form an annular space 14*b* so that the hydrophone can freely slide into and out of bore 14. When hydrophone 15 is not compressed by axially opposite pressures represented by vectors P*a* and P'*a* (FIG. 2), then the cross-sectional area of the elastomer body 17 is uniform throughout its axial length, and when it is so compressed, then the opposite end portions 17*a* and 17*b*, outside of cage 34 (FIG. 4) become compressed and form outwardly-extending annular rings 17'*a* and 17'*b*, respectively (FIG. 2).

These annular rings under substantial compression forces constitute effective seals against the inner wall 14'*a* of chamber 14*a* on the opposite sides of holes 16, as shown in FIG. 1. Thus the rigid cage 34 blocks transmission of the compressive forces to pressure detectors 37, 37' through the elastomer and effectively and substantially completely shields the pressure detectors 37, 37' from becoming subjected to a large static pressure P*a* which would otherwise considerably reduce the sensitivity of the detectors to seismic waves P*s* transmitted through the openings 16 by the fluid surrounding casing 12. Thus, cage 34 is opaque to compressive forces P*a* transmitted along axis 34*c* and is transparent to seismic waves P*s* along the other axis 34*b*.

An additional advantage obtained from cage 34 is derived from the seismic waves P*s* becoming exerted over a larger surface area between the annular rings 17'*a*, 17'*b* of the hydrophone, as compared to the embodiment described in the aforementioned copending patent application in which the seismic waves become exerted only upon the plugs formed by the elastomer body.

Means 19 are provided for compressing the elastomer body 17. In the preferred embodiment means 19 include a pair of discs 46, 48. Hydrophone 15 is disposed between these discs. The upper disc 46 abuts against the core 30' of transformer 30, and the bottom disc 48 is pushed inwardly by a threaded bottom end cap 32 having a conical shape to facilitate the insertion of the transducer unit 10 into marshy ground. The amount of axial pressure exerted by the discs 46, 48 against the opposite end portions 17*a*, 17*b* of the elastomer body 17 is determined by the amount of torque applied to the threaded end cap 32. The outward expansions 17'*a*, 17'*b* form very effective fluid-tight seals against wall 14'*a* and are by far superior to conventional O-ring seals. With such effective fluid-tight seals, transformer 30 remains dry when transducer unit 10 is submerged underwater in marshy terrain.

The elastomer body 17 should be water-impervious, sufficiently flexible, relatively incompressible, and have a hardness in the approximate range of 40 to 90 on the Shore A scale. It should have good thermal stability between −50° F. and +200° F. Typical of sound-transmitting materials that might be employed are natural rubber, synthetic rubber, silicon rubber, urethanes, flexible epoxys, etc. Silicon rubber can be employed having a hardness of 45 on the Shore A scale, a tensile strength of 400 psi., and an elongation of 180%. Silicon rubber can be purchased as a two-part liquid. Cage 34 with its detector assembly is positioned in a mold. Prior to pouring into the mold's cavity, the liquids are mixed together and the entrapped air is removed. The liquid mixture in the mold is cured using well-known methods.

A preferred type material for the encapsulant elastomer body 17 is SILGAN type H-621 manufactured by SWS Silicons with a tear strength of about 100 lbs. per inch. The hardness of the material is about 60 on the Shore A scale.

Although this invention has been described with reference to a presently preferred embodiment, it will be apparent to those skilled in the art that the advantages of this invention can be embodied in other structural forms. Among the advantages derived from the present invention are the following: the center portion of the elastomer core 17 surrounding cage 34 is only very slightly compressed, thereby not appreciably attenuating the acoustic energy transmission between the ambient fluid medium and the crystal detectors 37, 37', with only a negligible loss of signal level in the elastomer itself; the elastomer body's end portions 17*a*, 17*b*, being under great compression, establish excellent fluid-tight seals; this compression can be easily controlled by the threaded end cap 32; and release of compression by unscrewing end cap 32 makes it easy to remove from or install a hydrophone 15 in the hydrophone chamber 14*a*.

The transducer unit 10 of this invention is easily serviceable in the field, since all the internal components are removable, which is a considerable advantage over the transducer unit described in said U.S. Pat. No. 3,932,834. Also, the hydrophone's sensitivity has been increased by more than tenfold, as compared to the sensitivity in the embodiment described in said copending patent application Ser. No. 704,148, now U.S. Pat. No. 4,092,628.

What is claimed is:

1. An improved pressure transducer for use in a fluid including a rigid elongated casing having an inner bore and a sound-transmitting window in the wall of said casing, means for detachably sealing the ends of said casing, one of said sealing means having a fluid-tight conduit for entry of electrical conductors, a hydrophone assembly removably disposed in said bore adjacent to said sound transmitting window, said hydrophone assembly including a piezo-electric crystal assembly embedded in a sound-transmitting elastomeric core having two mutually perpendicular axes, means for adjustably applying a compressive force to said core in a direction along a first axis so that portions of said core expand radially outwardly to effect sealing engagement against the wall of said bore to block said fluid from penetrating into the bore of said casing through said sound-transmitting window beyond the sealing-engaging portions of said core, wherein the improvement comprises:

means for blocking transmission of said compressive force to said embedded crystal assembly.

2. The improved pressure transducer as defined in claim 1 wherein:

said blocking means is a rigid cage for containing said crystal assembly, said cage being completely embedded in said elastomeric core.

3. The improved pressure transducer as defined in claim 2 wherein:

said cage has two mutually perpendicular axes parallel to the corresponding axes of said core, said cage being opaque to the compressive force applied along the first axis and transparent to seismic waves applied along the second axis through said sound transmitting window.

* * * * *